2,652,746

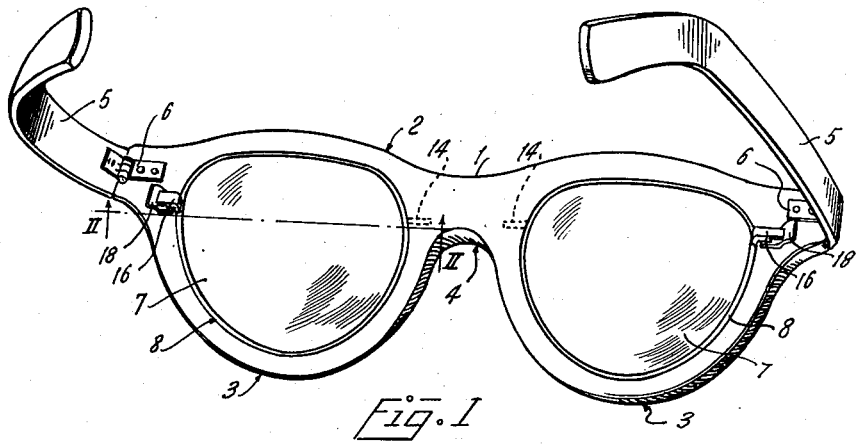
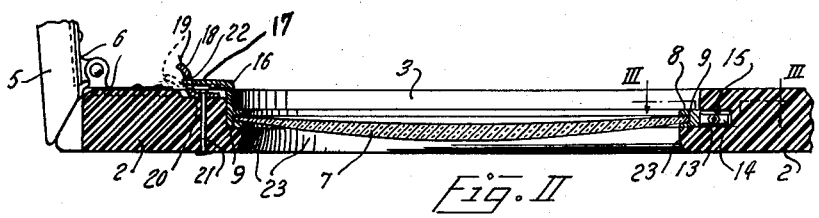
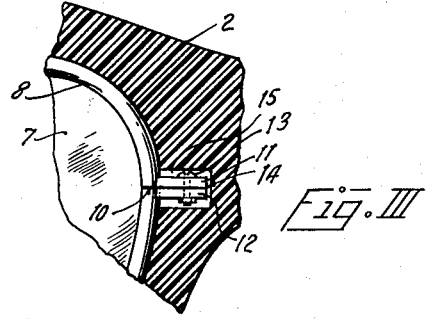
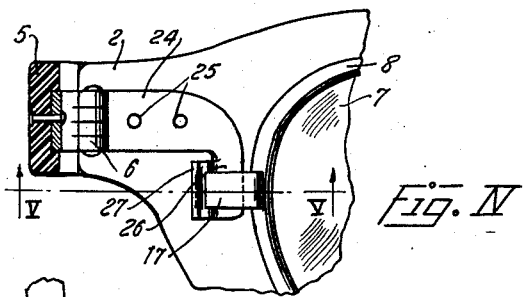
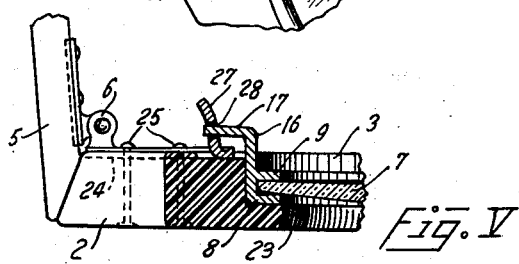
Robert Randolph Shanks
INVENTOR.
ATTORNEY Patented Sept. 22, 1953

UNITED STATES PATENT OFFICE 2,652,746

EYEGLASSES FRAME WITH DETACHABLY MOUNTED LENSES

Robert Randolph Shanks, Dallas, Tex.

Application December 11, 1950, Serial No. 200,146

2 Claims. (Cl. 88—47)

This invention is concerned with an eye glasses frame with detachably mounted lenses, and is particularly concerned with an eye glasses frame and lenses mounting wherein the lenses may be easily detachably mounted in the frame whereby frames and lenses may be easily and quickly interchanged.

Eye glasses frames are customarily made with grooves on the inner sides of the lenses openings for receiving the lenses. In order to mount a lens in a plastic frame, it has been the practice to heat the frame with an electrical heating device or otherwise to expand it so that the lens may be placed in the groove about the lens opening and the frame is then contracted about the lens by immersing it in cold water or otherwise. Metal frames are customarily divided so that they may be taken apart for placing the lenses therein.

When a lens is so mounted it is difficult to remove and is intended to be permanently mounted. In any event, in order to remove it, special tools and the services of an optician are usually required.

Many persons require different lenses for reading and for seeing at a distance; and many of them have two or more pairs of glasses with different types of lenses in them for such reason. Also many persons have colored lenses ground to their prescription in order to avoid the necessity of attaching colored lenses over their eye glasses frame.

In order to avoid the duplication of separate eye glasses for reading and for walking, it has been the practice in the past to make bifocal lenses. Bifocal lenses are objectionable to many people because it is difficult for them to walk, while wearing them.

Recently eye glasses frames have been made of plastic and metal of varying colors and of ornamental design, in order to enhance the appearance of the wearer; and many persons buy several pairs of glasses in order to have a variety of differently appearing frames. This is expensive, since lenses must be ground for each pair of glasses.

My invention is intended to provide an eye glasses frame and lenses assembly wherein the lenses may be easily attached and detached therefrom by the wearer, so the wearer may have a variety of differently colored and ornamental frames in which he may interchangeably place a single set of lenses. By the use of my invention the wearer may have a variety of frames and it will only be necessary for him to purchase a single set of lenses. Furthermore if the wearer is required to have reading lenses and distance lenses, he may interchangeably place the lenses in a single frame, thus avoiding the expense of having duplicate frames for the separate sets of lenses. The wearer may also have a set of colored lenses ground to his prescription which he may interchangeably place in a single frame, without the necessity of duplicating frames.

The primary object of my invention is to provide a detachable lens for eye glasses which may be easily and quickly mounted or detached by the wearer.

A further important object of my invention is to provide a lens mounting in an eye glasses frame which permits the lenses to be detachably mounted thereto, so that lenses may be interchangeably mounted in such frame.

A still further object of my invention is to provide such an eye glasses frame with detachable lenses wherein the attaching elements are concealed from frontal view.

Another object of my invention is to provide such an eye glasses frame with detachably mounted lenses wherein the lenses may be easily and quickly mounted by the wearer by feel, and without visual assistance.

A still further object of my invention is to provide a detachably mounted eye glasses lens with a rim thereabout which may be easily taken apart for replacement of the lenses, such rim having an extension on one side insertable in a recess in the glasses frame and an extension on the diametrically opposite side which may be detachably held by a catch on the glasses frame thereby detachably securing the lenses to the frame.

Another object of my invention is to provide such an eye glasses frame with detachably mounted lenses wherein a peripheral ledge is provided around the front of the lenses openings in the frame, which conceals the lenses rims from frontal view.

Other and further objects of my invention will be apparent upon reading the detailed specification hereinafter following and by referring to the drawings.

Preferred embodiments of my invention are shown in the drawings in which,

Fig. I is a rear perspective view of a pair of eye glasses employing my invention;

Fig. II is a cross-sectional elevational view taken along the line II—II of Fig. I;

Fig. III is a fragmentary cross-sectional elevational view showing the detachable joinder of the lenses rim and the extension formed thereon inserted into a recess in the edge of the lens opening in the frame, such cross-sectional view being taken along the line III—III of Fig. II;

Fig. IV is an elevational view of a modified form of catch for retaining the lens in the eye opening of the frame; and Fig. V is a cross-sectional elevational view taken along the line V—V of Fig. IV.

Numeral references are employed to designate the various parts shown in the drawings and like numerals are used to designate like parts throughout the various figures of the drawings.

Numeral 1 designates an eye glasses frame which has a front portion 2 with lens openings 3 therein, such lens openings being connected by a bridge or a nose piece 4.

The temples 5 are joined to the front 2 by means of conventional hinges 6.

The lenses 7 are enclosed by a rim 8 made of metal, plastic or other suitable material. The rim 8 has a groove 9 around the inner side thereof in which the outer edge of the lens is disposed and held.

The rim 8 is divided by a separable joint 10 at one side thereof. A lug 11 is joined to the rim 8 at one side of the separable joint 10, and the lug 12 is joined to the rim 8 at the other side of the separable joint 10. In assembling the lens with the rim 8, the edge thereof is placed in the groove 9 and the separable joint 10 is drawn together. A screw 13 is drawn up through the lugs 11 and 12 to thereby firmly hold the separable joint 10 together. Thereby the lens 7 is removably mounted in the rim 8.

The lugs 11 and 12, when drawn together and joined by the screws 13 in the manner shown in Fig. III, forms an extension 14 on the rim 8. A recess 15 is provided in the side of the eye piece 3, extending inwardly toward the bridge 4, such recess being provided for the purpose of receiving the extension 14, thereby holding one side of the lens in the lens opening. The recess 15 could be lined by a ferrule, if desired.

An extension or latch 16 is provided on the diametrically opposite side of the rim 8 from the extension 14. The extension or latch 16 extends upwardly and outwardly from the rim and has an outwardly extending leg 17 thereon at substantially right angles to the upwardly extending portions thereof.

A catch 18 extends upwardly from the back side of the front 2 of the frame and has a curved outwardly extending portion 19 thereon. The attachment leg 20 of the catch 18 is secured to the frame by means of a brad or rivet 21.

An opening 22 is provided through the upwardly extending arm 19 of the catch 18, through which opening the leg 17 of the extension 16 passes, when the lens 7 is secured in place in the frame.

The catch 18 is preferably made of spring steel or other spring-like material so that it may be easily bent and displaced from normal position but when released will spring back into predetermined normal position.

An inwardly extending ledge or shoulder 23 is provided on the outer side of the lens opening 3, such ledge, or shoulder being sufficiently wide to support the lens rim 8 and completely conceal it from frontal view when the lens is in place in the lens opening.

To place a lens in the lens opening in the eye glasses frame disclosed, the lens is first mounted in a rim 8 in the manner hereinbefore described.

Extension 14 is then placed in the recess 15. This may be done by merely feeling for the recess and guiding the extension 14 therein by touch. Thus a person who cannot see without glasses could easily place the extension within the recess. After the extension has thus been placed in the recess, the end of the outwardly extending leg 17 of the rim extension 16 is placed against the curved surface of the outwardly extending portion 19 of the catch 18. The lens is then pressed into the lens opening. As the end of the leg 17 is guided downward over the curved surface of the catch the extension 19 is sprung outward and the leg 17 will enter the hole 22. A guide slot could be provided on the outer surface of extension 19 for guiding the leg 17 into the opening 22. The spring extension 19 of the catch 18 will be released by the leg 17 entering the hole 22 and will spring inward and thus catch and retain the extension 17 within the hole. Thus the lens is held firmly in place in the lens opening, the extension 14 within the recess 15 holding it on one side and the catch 18 holding it on the diametrically opposite side. Thus the lens is held against horizontal and vertical displacement. The ledge 23 retains the lens against outward movement and conceals the rim 8 from frontal view.

When so mounted the lenses are retained in the frame on a predetermined axis as required by the wearer's prescription, and such axis is maintained when lenses are interchanged.

The lens may be easily and quickly removed from the lens opening, by merely pressing downward on the upwardly extending portion 19 of the catch 18, thus releasing the outwardly extending leg 17 from the hole 22. After being thus released the lens may be lifted out of the lens opening.

It may be seen that a lens thus mounted may be very easily, quickly and simply mounted and removed, and other lenses having a rim 8 thereon may be easily placed in the frame; and such manipulation may be made by feel and without visual assistance.

A modified form of catch is shown in Figures IV and V wherein a portion 24 of the hinge 6 is secured to the back side of the front of the frame by means of screws or rivets 25. Such hinge piece 24 has an integral downwardly extending leg 26 to which a catch 27 with a hole 28 therein is integrally attached, such catch being comparable in shape and function to the catch 18. Such a modified form of catch may be provided for the purpose of simplicity and economy where the eye glasses frame is manufactured with my invention thereon. On the other hand, when my invention is to be attached to an already manufactured frame, the form of catch shown in Figs. I and II may be easily and readily attached thereto.

It is apparent that any existing eye glasses frame of the type disclosed, of either plastic, metal or of other material, may be readily adapted for attachment of my invention. The recesses 15 may be easily provided in the sides of the lenses openings, and a catch 18 may be easily attached adjacent the lenses openings.

It is obvious that I have provided an eye glasses frame with detachable lenses therefor whereby a multiplicity of pairs of lenses may be used with a single frame, thus saving the expense of having extra frames when a multiplicity of pairs of lenses are desired, or having a multiplicity of pairs of lenses when a multiplicity of frames are desired, and the lenses may be easily placed in and removed from the frame without visual aid by the wearer of the eye glasses.

It is understood that other and further forms of my invention may be made without departing from the spirit and scope of the appended claims.

I claim:

1. In eye glasses; a frame; lens openings in said frame; a socket on the inner side of each lens opening; a spring catch on said frame adjacent each lens opening; said catch extending outwardly from the frame and being curved away from the lens opening; a hole in each said catch; a lens carried in each lens opening; an extension on each lens releasably inserted into one of said sockets; and another extension on each lens releasably fitted in a hole in a catch said extension being arranged to engage the curved surface of the catch when the first named extension is inserted in the socket to thereby spring the catch outwardly when pressed thereagainst to thereby permit the second named extension to enter the hole in the catch.

2. Lenses mounting for eye glasses frame having a front frame portion with lens openings therein connected by a nose piece; a socket extending inwardly from each lens opening toward the said nose piece; a spring catch on said frame adjacent to each said lens opening on substantially the diametrically opposite side of the lens opening from the said socket; said catch extending outwardly from the frame and being curved away from the lens opening; a hole in each said catch; an extension carried by the lens arranged to releasably enter the said socket; and another extension carried by said lens arranged to engage the curved surface of the catch when the first named extension is inserted in the socket to thereby spring the catch outwardly when pressed thereagainst to thereby permit the said extension to releasably enter the hole in the catch.

ROBERT RANDOLPH SHANKS.

References Cited in the file of this patent

UNITED STATES PATENTS

| Number | Name | Date |
| --- | --- | --- |
| 1,001,387 | Goddard | Aug. 22, 1911 |
| 1,431,657 | Hilder | Oct. 10, 1922 |
| 2,282,637 | Bouchard | May 12, 1942 |
| 2,452,159 | Small | Oct. 26, 1948 |

FOREIGN PATENTS

| Number | Country | Date |
| --- | --- | --- |
| 463,000 | Great Britain | Mar. 19, 1937 |